(12) United States Patent
Yauchi et al.

(10) Patent No.: US 12,248,295 B2
(45) Date of Patent: Mar. 11, 2025

(54) SYSTEM FOR ADJUSTING BALANCE AND RUNOUT OF ROTARY TOOL, DEVICE FOR DETERMINING THE BALANCE AND RUNOUT, METHOD OF ADJUSTING THE BALANCE AND RUNOUT, AND TOOL HOLDER

(71) Applicants: BIG DAISHOWA CO., LTD., Osaka (JP); BIG DAISHOWA SEIKI CO., LTD., Osaka (JP)

(72) Inventors: Masataka Yauchi, Osaka (JP); Kouichi Uemura, Osaka (JP); Yukio Tsujita, Osaka (JP); Reina Oohashi, Osaka (JP); Shunsuke Kumasaki, Osaka (JP); Akihito Funashoku, Osaka (JP)

(73) Assignees: BIG DAISHOWA CO., LTD., Osaka (JP); BIG DAISHOWA SEIKI CO., LTD., Osaka (JP)

( * ) Notice: Subject to any disclaimer, the term of this patent is extended or adjusted under 35 U.S.C. 154(b) by 0 days.

(21) Appl. No.: 18/637,807

(22) Filed: Apr. 17, 2024

(65) Prior Publication Data

US 2024/0264578 A1   Aug. 8, 2024

Related U.S. Application Data

(62) Division of application No. 16/976,591, filed as application No. PCT/JP2018/007941 on Mar. 2, 2018, now Pat. No. 12,032,351.

(51) Int. Cl.
*G05B 19/404* (2006.01)
*B23Q 11/00* (2006.01)
(Continued)

(52) U.S. Cl.
CPC ........ *G05B 19/404* (2013.01); *B23Q 11/0035* (2013.01); *B23Q 17/22* (2013.01);
(Continued)

(58) Field of Classification Search
CPC ..... G05B 15/02; G05B 19/4065; G01M 1/00; G01M 1/30; G01M 1/32; G01M 1/36;
(Continued)

(56) References Cited

U.S. PATENT DOCUMENTS 5,033,923 A   7/1991  Osawa
5,096,345 A   3/1992  Toyomoto
(Continued)

FOREIGN PATENT DOCUMENTS

CN   101130923 A        2/2008
CN   101130923 B   *   6/2010   ........... D06F 37/225
(Continued)

OTHER PUBLICATIONS

O. Ryabov et al., "Laser displacement meter application for milling diagnostics," Optical Lasers and Engineering vol. 30, Nos. 3-4 (1998): 251-263.

*Primary Examiner* — Ronald D Hartman, Jr.
(74) *Attorney, Agent, or Firm* — Dilworth & Barrese, LLP.; Michael J. Musella, Esq.

(57) ABSTRACT

A balance and runout amount adjustment system for a rotary tool includes a rotary tool constituted of a tool holder mounted on a spindle, a balance determining device configured to obtain outer circumference position data of the rotary tool and to determine a mass balance of the rotary tool based on the outer circumference position data obtained, in the course of rotation of the rotary tool and a runout determining device configured to obtain shape data of the rotary tool and to determine a runout amount of the rotary tool based on the shape data obtained, in the course of rotation of the rotary tool. The rotary tool is configured to be capable of adjustment of the mass balance based on the result of the determination made by the balance determining device and capable also of adjustment of the runout amount
(Continued)

based on the result of the determination made by the runout determining device.

1 Claim, 14 Drawing Sheets

(51) Int. Cl.
| | | |
|---|---|---|
| *B23Q 17/00* | (2006.01) | |
| *B23Q 17/22* | (2006.01) | |
| *B23Q 17/24* | (2006.01) | |
| *G01M 1/00* | (2006.01) | |
| *G01M 1/30* | (2006.01) | |
| *G01M 1/32* | (2006.01) | |
| *G01M 1/36* | (2006.01) | |
| *G05B 19/4065* | (2006.01) | |

(52) U.S. Cl.
CPC ..... *B23Q 17/2409* (2013.01); *B23Q 17/2457* (2013.01); *G01M 1/00* (2013.01); *G01M 1/30* (2013.01); *G01M 1/32* (2013.01); *G01M 1/36* (2013.01); *G05B 19/4065* (2013.01); *B23Q 2017/001* (2013.01); *B23Q 2717/00* (2013.01); *G05B 2219/37234* (2013.01); *G05B 2219/37349* (2013.01); *G05B 2219/49177* (2013.01)

(58) Field of Classification Search
CPC ................ B23Q 11/0035; B23Q 17/22; B23Q 2017/001
USPC ....................................................... 700/173
See application file for complete search history.

(56) References Cited

U.S. PATENT DOCUMENTS

| | | | | |
|---|---|---|---|---|
| 5,240,358 | A * | 8/1993 | Hackett | B23Q 11/0035 |
| | | | | 409/141 |
| 5,286,042 | A | 2/1994 | Laube | |
| 5,493,763 | A * | 2/1996 | Yamanaka | G01M 1/34 |
| | | | | 82/903 |
| 6,053,678 | A | 4/2000 | D'Andrea | |
| 6,322,299 | B1 | 11/2001 | Hartman | |
| 6,557,445 | B1 | 5/2003 | Ishikawa | |
| 6,883,373 | B2 * | 4/2005 | Dyer | G01M 1/22 |
| | | | | 73/462 |
| 6,901,798 | B2 * | 6/2005 | Trionfetti | G01M 1/36 |
| | | | | 73/462 |
| 7,717,013 | B2 * | 5/2010 | Hildebrand | F16F 15/322 |
| | | | | 74/574.2 |
| 8,100,009 | B2 * | 1/2012 | Dyer | G01M 1/36 |
| | | | | 73/462 |
| 10,183,350 | B2 * | 1/2019 | Plessing | B24B 47/12 |
| 2003/0175088 | A1 | 9/2003 | Matasumoto et al. | |
| 2003/0228199 | A1 | 12/2003 | Matsumoto et al. | |
| 2006/0062645 | A1 | 3/2006 | Matasumoto et al. | |
| 2007/0053758 | A1 | 3/2007 | Matasumoto et al. | |
| 2007/0198123 | A1 * | 8/2007 | Hoffman | G05B 19/4065 |
| | | | | 700/177 |
| 2010/0305898 | A1 | 12/2010 | Yamaguchi et al. | |
| 2012/0163936 | A1 | 6/2012 | Hecht | |
| 2013/0174658 | A1 | 7/2013 | Kataoka et al. | |
| 2020/0278659 | A1 * | 9/2020 | Liu | G05B 19/4155 |

FOREIGN PATENT DOCUMENTS

| | | | | |
|---|---|---|---|---|
| CN | 103119411 A | | 5/2013 | |
| EP | 1203938 A1 | | 5/2002 | |
| EP | 1203938 B1 | * | 2/2003 | ............... B23B 5/02 |
| EP | 1064528 B1 | * | 7/2003 | ............ G01M 1/323 |
| JP | S60-16328 A | | 1/1985 | |
| JP | S61-138136 A | | 6/1986 | |
| JP | H03-87539 U | | 9/1991 | |
| JP | H05-53839 U | | 7/1993 | |
| JP | 2001-138162 A | | 5/2001 | |
| JP | 2002-219629 A | | 8/2002 | |
| JP | 2003-089030 A | | 3/2003 | |
| JP | 2004-9244 A | | 1/2004 | |
| JP | 2004-066443 A | | 3/2004 | |
| JP | 2009-119555 A | | 6/2009 | |
| JP | 2010-274375 A | | 12/2010 | |
| JP | 2011-194500 A | | 10/2011 | |
| JP | 2013-103281 A | | 5/2013 | |
| JP | 2013-129011 A | | 7/2013 | |
| JP | 2014-505599 A | | 3/2014 | |
| TW | 2003-06244 A | | 11/2003 | |
| WO | WO-9617294 A1 | * | 6/1996 | ......... B23Q 11/0035 |
| WO | WO-2011140016 A1 | * | 11/2011 | ............. G01H 1/003 |
| WO | WO-2014052426 A1 | * | 4/2014 | ............ B64C 11/008 |
| WO | WO-2019050799 A1 | * | 3/2019 | ............ G01B 11/026 |

* cited by examiner

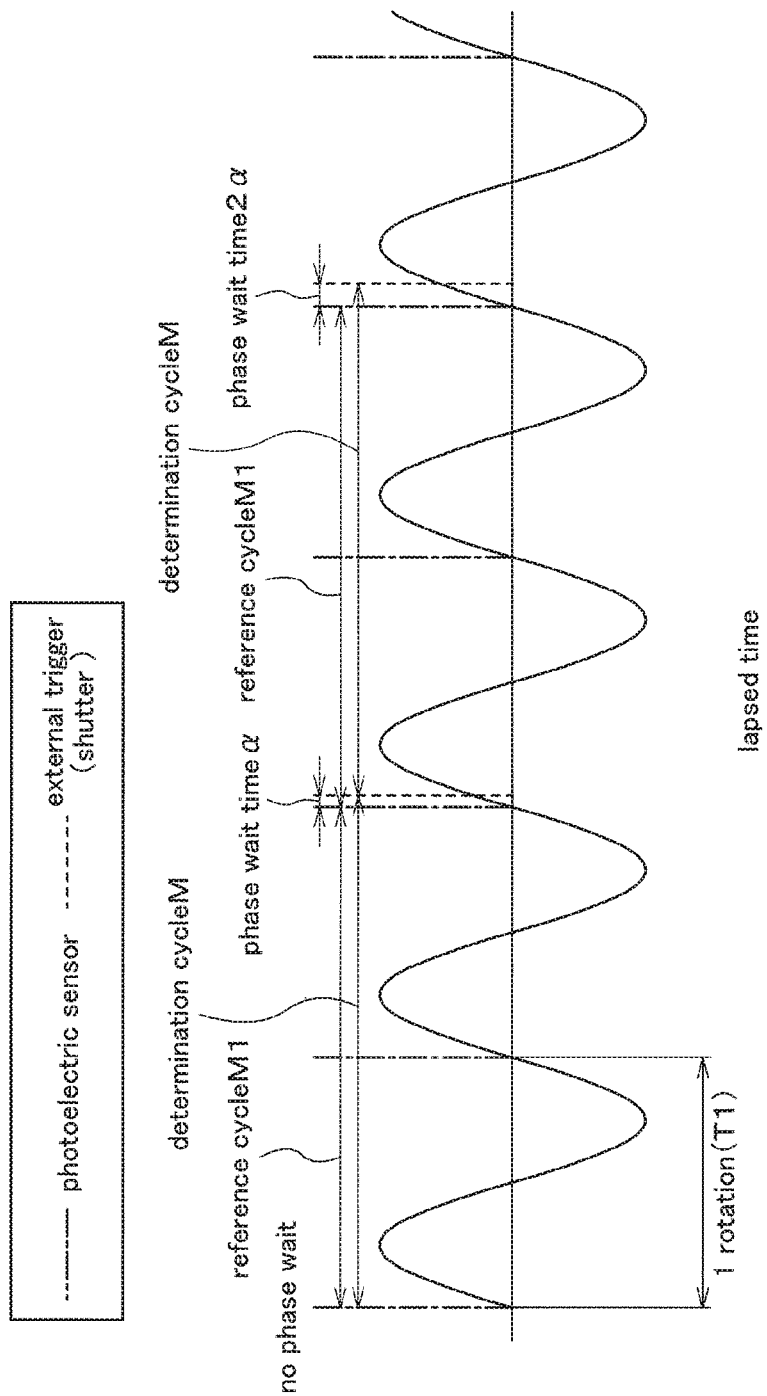

SYSTEM FOR ADJUSTING BALANCE AND RUNOUT OF ROTARY TOOL, DEVICE FOR DETERMINING THE BALANCE AND RUNOUT, METHOD OF ADJUSTING THE BALANCE AND RUNOUT, AND TOOL HOLDER

TECHNICAL FIELD

The present invention relates to a system for adjusting balance and runout of a rotary tool, a device for determining such balance and runout, a method of adjusting such balance and runout and a tool holder.

BACKGROUND ART

For example, a cutting machining on a workpiece is effected with attaching a cutting tool to a tool holder mounted on a spindle of a machine tool. In this case, when vibration occurs in the tool holder (rotary tool) including the cutting tool, there occurs reduction in the machining precision of the workpiece. As factors causing such vibration in the rotary tool, imbalance of the mass of the rotary tool, runout of a blade portion included in the cutting tool, etc. are conceivable.

PTL 1 discloses an arrangement of a tool holder (rotary tool) capable of adjusting the mass balance. In this PTL 1, the rotary tool includes a flange-like portion and in a tool-side end face of this flange-like portion, there are defined a plurality of screw holes arranged on a single circumference centering about an axis. In these respective screw holes, weights having different masses can be assembled. With this arrangement, based on a result of a balance test effected with using a balancing machine, the weight to be assembled in each screw hole will be replaced by a weight having a different mass when needed. In this way, adjustment of the mass balance is made possible.

Further, PTL 2 discloses an arrangement of a tool holder (rotary tool) capable of runout amount adjustment of a tool to be attached thereto. In the case of the tool holder of this Patent Document 2 also, the tool holder has a flange-like portion and in a tool-side end face of the flange-like portion, three screw holes are arranged in distribution on a single circumference centering about an axis. In each screw hole, a screw member is assembled. In this case, by changing the clamping amount of the screw member relative to the screw hole, runout of a tool attached to the tool holder can be adjusted.

CITATION LIST

Patent Literature

PTL 1: Japanese Unexamined Utility Model Publication Hei. 3-87539
PTL 2: Detailed disclosure of U.S. Pat. No. 5,286,042

SUMMARY

Technical Problem

In recent years, in the case of machining on a precision mold for use in manufacturing e.g. an optical lens, etc., the machining sometimes involves mirror finishing of the mold surface. Such mirror finishing is effected by cutting machining treatment after completion of cutting machining of the precision mold. With the precision mold, even small dimensional change may be problematic in a resultant product. For this reason, when the machining is effected by means of a rotary tool, precision adjustment of its mass balance and runout amount is needed.

In the above regard, the tool holder of PTL 1 does not allow runout amount adjustment of the tool attached to the tool holder. Whereas, the tool holder of PTL 2 does not allow mass balance adjustment. When the mirror finishing is to be effected, it is necessary to rotate the rotary tool at a high speed. However, adjustments of the mass balance and the runout amount in high precision are difficult for a rotary tool which is rotated at a high speed. For this reason, there has been room for improvement in effecting the adjustments of both the mass balance and the runout amount of the rotary tool.

In view of the above-described state of the art, there is a need for a system for adjusting balance and runout of a rotary tool that allows easy and precision adjustments of the mass balance and the runout amount.

Solution to Problem

According to a characterizing feature of a balance and runout amount adjustment system relating to the present invention, the system comprises:
  a rotary tool constituted by attaching a tool to a tool holder mounted on a spindle;
  a balance determining device configured to obtain outer circumference position data of the rotary tool and to determine a mass balance of the rotary tool based on the outer circumference position data obtained, in the course of rotation of the rotary tool; and
  a runout determining device configured to obtain shape data of the rotary tool and to determine a runout amount of the rotary tool based on the shape data obtained, in the course of rotation of the rotary tool;
  wherein the rotary tool is configured to be capable of adjustment of the mass balance of the rotary tool based on the result of the determination made by the balance determining device and capable also of adjustment of the runout amount based on the result of the determination made by the runout determining device.

With the above-described configuration, in the course of rotation of the rotary tool, the mass balance of this rotary tool can be determined by using the balance determining device and also the runout amount of the rotary tool can be determined by using the runout determining device. With these, the mass balance and the runout amount of the rotary tool can be determined easily. Moreover, since the adjustment of the mass balance and the adjustment of the runout amount of the rotary tool are effected separately based on the determination result of the balance determining device and the determination result of the runout determining device, the adjustments of the mass balance and the runout amount can be effected with high precision. As a result, it is possible to improve the machining precision of a workpiece by the rotary tool.

According to a further feature, wherein:
  the runout determining device includes:
    an image sensor for imaging the rotary tool; and
    a control section for executing an imaging operation by the image sensor at every predetermined time; and
  wherein the control section is capable of setting selectively the predetermined time to a time which is shorter than a half of a rotation cycle of the rotary tool and/or to a time which is longer than the rotation cycle.

With the above-described configuration, the runout determining device for determining a runout amount of the rotary tool includes an image sensor for imaging (i.e. capturing an image of) the rotary tool and a control section for executing an imaging operation by the image sensor at every predetermined time. With this runout determining device, when the rotational speed of the rotary tool is low, by setting the predetermined time for executing an imaging operation by the image sensor to a time shorter than a half of a rotation cycle of the rotary tool, it is possible to image (capture the images of) the tool of the rotary tool for a plurality of times. However, when a mirror finishing or the like is to be effected as a cutting machining treatment of a workpiece such as a precision mold, it is necessary to rotate the rotary tool at a high speed.

For instance, when the rotary tool is rotated at a high speed and the rotation cycle of this rotary tool becomes less than two folds (twice) of the minimum imaging interval time (the reciprocal of its maximum frame rate) of the image sensor (camera), the image sensor can no longer effect a plurality of times of imaging operations within one rotation of the rotary tool. Then, according to the above-described configuration, the control section for executing an imaging operation by the image sensor at every predetermined time can set this predetermined time (imaging cycle) to a time which is longer than the rotation cycle. With this, the imaging of the rotary tool located at a plurality of rotational angles different for each rotation is possible. Consequently, in not only the case of the rotational speed of the rotary tool being low, but also the case of the rotational speed of the rotary tool being high, the runout amount of the rotary tool can be determined appropriately.

According to a further feature, the tool holder is configured to be capable of the adjustments of the mass balance and the runout amount while the tool holder is mounted on the spindle.

With the above-described configuration, the tool holder is configured to be capable of the adjustments of the mass balance and the runout amount while the tool holder is mounted on the spindle. Thus, the adjustment of the mass balance and the adjustment of the runout amount can be effected by a single device (the tool holder). With this, in the balance and runout adjustment system of a rotary tool, operability thereof in the adjustments of the mass balance and the runout amount is improved. Moreover, it becomes also possible to reduce the space occupied by the device. Furthermore, since the determinations and adjustments are possible with keeping the positional relation among the machine spindle, the tool holder and the rotary tool which have been once mounted, the adjustments of the mass balance and the runout amount are possible under a condition which is very similar to the actual working environment.

According to a characterizing feature of a tool holder relating also to the present invention, the tool holder comprises:
 a shank portion provided on one end side in a direction of a rotational axis and configured to be attached to a spindle;
 a chuck portion provided on the other end side in the rotational axis direction and configured to allow attachment of a tool thereto;
 a plurality of insertion holes formed around the rotational axis at an intermediate portion provided between the shank portion and the chuck portion; and
 an insertion member configured to be accommodated and clamped in one of the insertion holes;
 wherein any one of a plurality of said insertion members having masses different from each other can be assembled in each one of the plurality of insertion holes; and
 by varying a clamping amount of the insertion member relative to the insertion hole, a leading end side of the chuck portion can be deformed in a direction perpendicular to the rotational axis.

With the above-described configuration, since the tool holder is configured to allow assembly of a plurality of insertion members having different masses respectively in each one of the plurality of insertion holes formed at the intermediate portion, by adjusting the masses of the insertion members to be assembled in the plurality of insertion holes, the mass balance adjustment is made possible. Further, since the tool holder is configured also such that by varying the clamping amount of the insertion member relative to the insertion hole, the leading end side can be deformed in the direction perpendicular to the rotational axis, the adjustment of the runout amount of the leading end side is made possible also. In this way, the tool holder having the inventive configuration allows adjustments of both the mass balance and the runout amount by the plurality of insertion holes and the insertion members to be assembled in the insertion holes. Therefore, this tool holder allows the mass balance adjustment and the runout amount adjustment through simple configuration.

According to a feature of a balance and runout determining device relating also to the present invention, in a device for determining balance and a runout of a rotary tool constituted by attaching a tool to a tool holder mounted on a spindle, the determining device comprises:
 an image sensor for imaging the rotary tool; and
 a calculating section for calculating a mass balance and a runout amount of the rotary tool based on the image obtained by the image sensor;
 wherein in the course of rotation of the rotary tool, the calculating section obtains outer circumference position data of the rotary tool based on the obtained image and determines a mass balance of the rotary tool from the outer circumference position data; and
 wherein in the course of rotation of the rotary tool, the calculating section obtains shape data of the rotary tool based on the obtained image and calculates a runout amount of the rotary tool based on the shape data.

With the device for determining balance and runout of a rotary tool having the above-described inventive configuration, with using the image sensor and the calculating section, the mass balance and the runout amount of the rotary tool can be determined in the course of rotation of the rotary tool. Thus, the determination of the mass balance and the determination of the runout amount can be effected by a single device. With this, operability in determining the mass balance and the runout amount of the rotary tool is improved. Moreover, in configuring a system for adjusting balance and runout of a rotary tool, as it is not necessary to provide a balance determining device and a runout determining device separately, it becomes also possible to reduce the occupied space.

According to a feature of a method of adjusting balance and runout of a rotary tool relating to the present invention, in a method of adjusting balance and runout of a rotary tool constituted by attaching a tool to a tool holder mounted on a spindle, the adjusting method comprises:
 a balance determining step of obtaining outer circumference position data of the rotary tool and determining a mass balance of the rotary tool from the outer circumference position data in the course of rotation of the rotary tool;

a balance adjusting step of increasing/decreasing the mass of the tool holder based on the result of the determination of the balance determining step with the tool holder being mounted on the spindle, thereby to adjust the mass balance of the rotary tool;

a runout determining step of obtaining shape data of the rotary tool and determining a runout amount of the rotary tool from the shape data, in the course of rotation of the rotary tool; and a runout adjusting step of adjusting a runout amount of the rotary tool based on the result of the determination of the runout determining step, by deforming a leading end side of the tool holder to a direction perpendicular to a rotational axis of the rotary tool, with the tool holder being mounted on the spindle.

With the inventive method of adjusting balance and runout of a rotary tool having the above-described configuration, in the course of rotation of the rotary tool, the mass balance of the rotary tool can be determined by the balance determining step and also the runout amount of the rotary tool can be determined by the runout determining step. With this, the mass balance and the runout amount of the rotary tool can be determined easily. Further, the adjustment of the mass balance and the runout amount of the rotary tool are both done in the tool holder which is kept mounted on the spindle. As a result, the adjustments of the mass balance and the runout amount of the rotary tool based on the results of the determinations can be carried out easily and with high precision.

BRIEF DESCRIPTION OF DRAWINGS

FIG. 23 is a graph showing the determination cycle relating to the second embodiment.

Embodiments of the present invention will be explained with reference to the accompanying drawings.

FIRST EMBODIMENT

Figure 1:
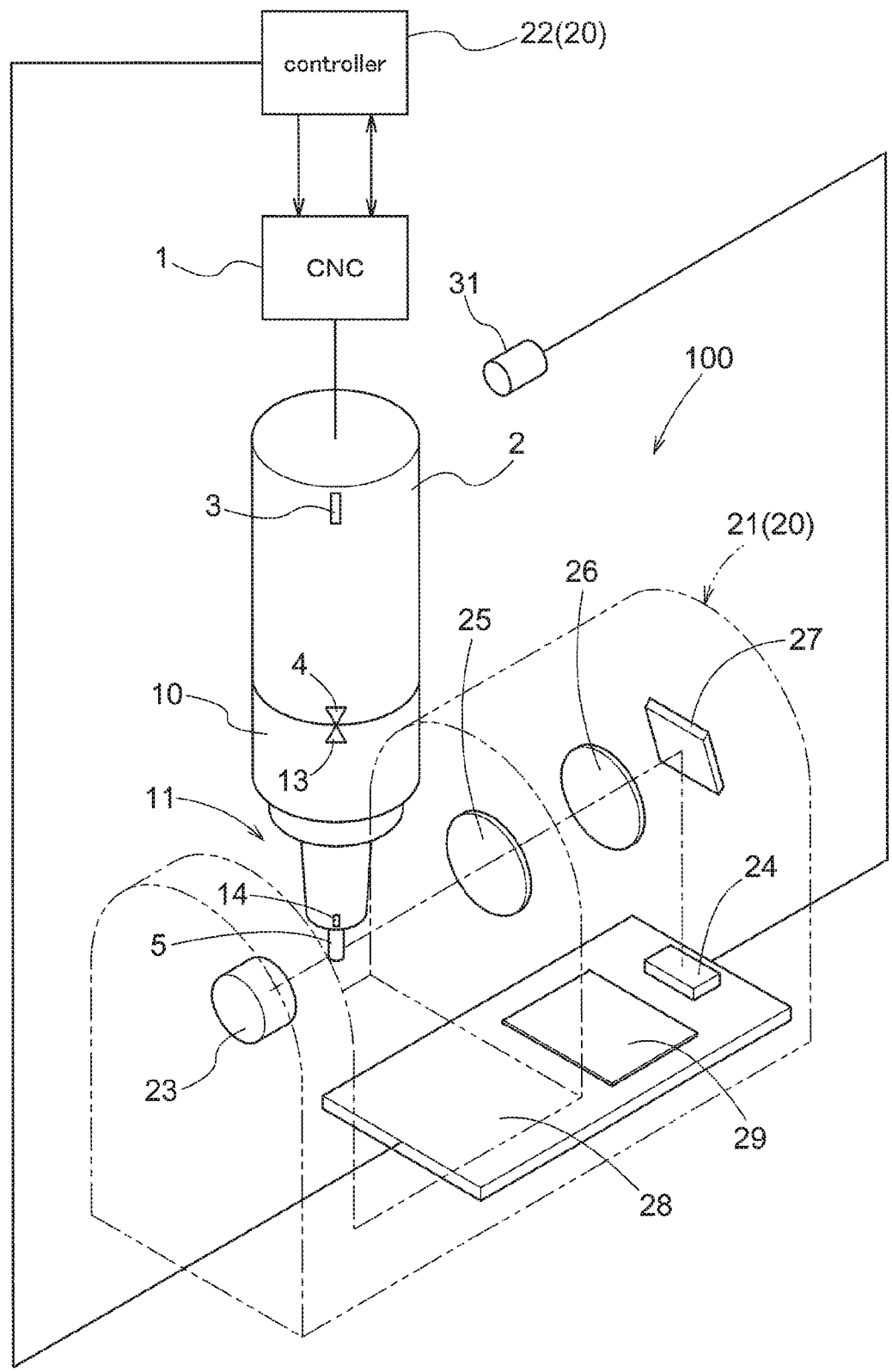
FIG. 1 is a schematic showing a balance and runout adjustment system for a rotary tool.

A balance and runout adjustment system is used in adjusting a mass balance and a runout amount of a rotary tool including a cutting tool used in e.g. a mirror finishing of a precision mold. As shown in FIG. 1, the balance and runout adjustment system 100 includes a rotary tool 11 having a tool 5 and an imaging device 20. In this embodiment, with use of the imaging device 20, a mass balance and a runout amount of the rotary tool 11 are determined. The imaging device 20 consists essentially of an imaging section 21 and a controller 22. The imaging section 21 is to be installed on a machine tool 1 of a computerized numerical control (CNC) type having a rotary tool 11 attached thereto.

As shown in FIGS. 1 through 4, the rotary tool 11 is constituted by attaching the tool 5 to a tool holder 10 which is to be mounted on a spindle 2 of the machine tool 1. In the spindle 2, at an upper portion thereof, there is provided a first mark 3 used as a reference point of rotation phase and at a portion adjacent to the tool holder 10, there is provided a second mark 4. In the tool holder 10, at a portion thereof adjacent the spindle 2, a third mark 13 is provided and at a portion thereof adjacent the tool 5, a fourth mark 14 is provided. In the spindle 2, the first mark 3 and the second mark 4 are provided at a same position with respect to the circumferential direction. Further, in the tool holder 10, the third mark 13 and the fourth mark 14 are provided at a same position with respect to the circumferential direction. In this way, the first mark 3 and the second mark 4 and also the third mark 13 and the fourth mark 14 are arranged respectively along a rotational axis Z of the spindle 2.

Figure 2:
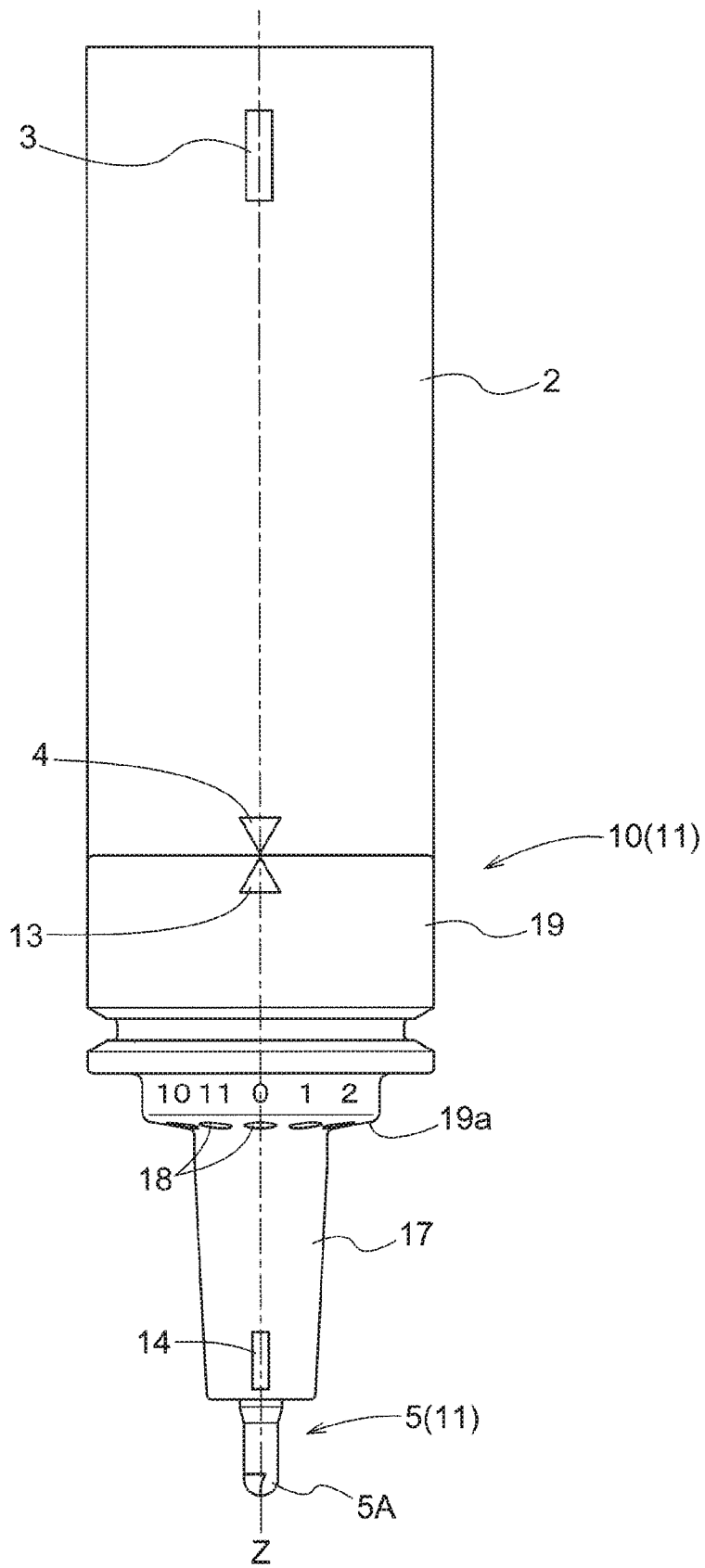
FIG. 2 is a view showing the rotary tool as being mounted on a spindle.
Figure 3:
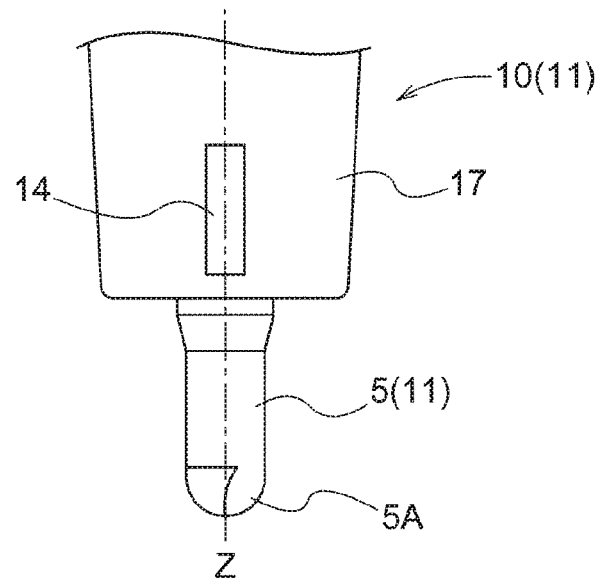
FIG. 3 is a view showing a tool portion of the rotary tool.

As shown in FIG. 2, the tool holder 10 is attached to the spindle 2, in such a manner that the second mark 4 and the third mark 13 are aligned in position with each other.

[Tool Holder]

Figure 4:
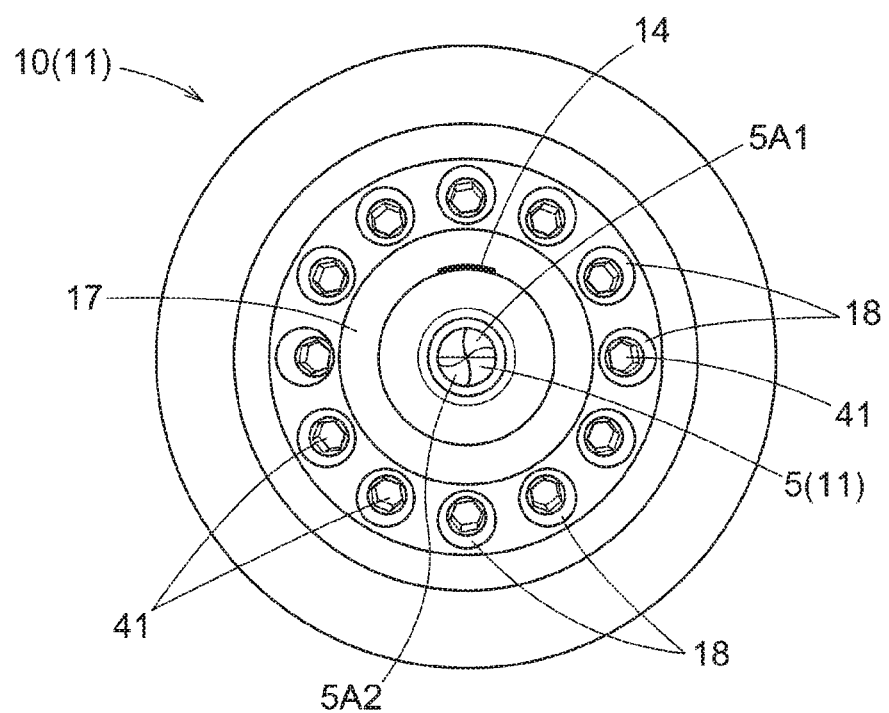
FIG. 4 is a view showing the rotary tool as being seen from its tool leading end (cutting edge) side.
Figure 5:
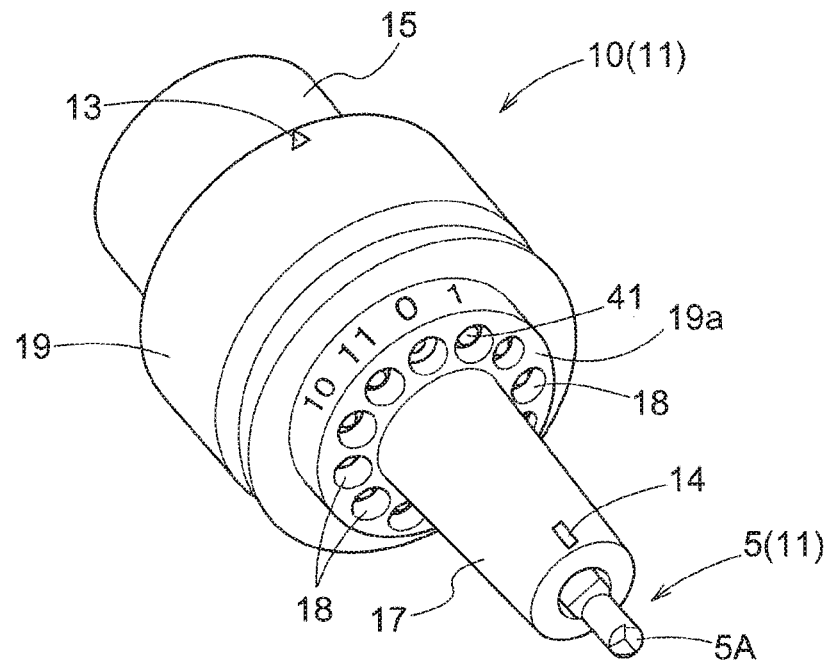
FIG. 5 is a perspective view of a tool holder.
Figure 6:
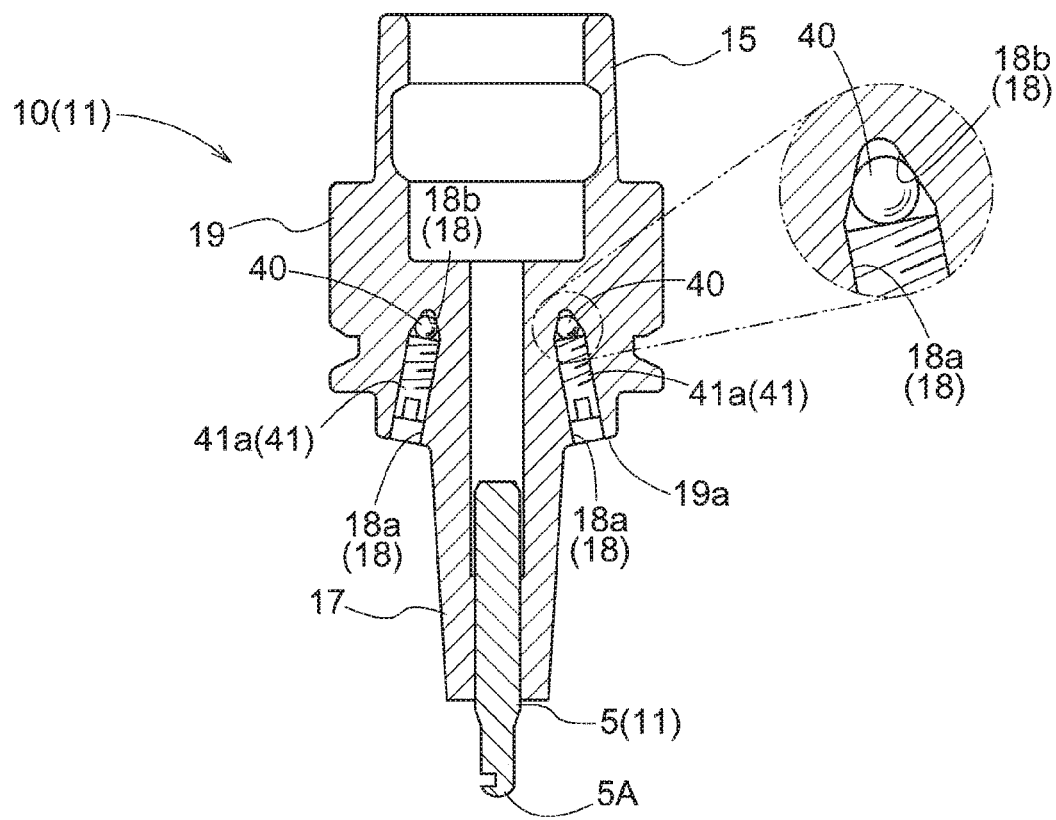
FIG. 6 is a side view in section showing the tool holder.

As shown in FIGS. 4 through 6, the tool holder 10 includes a shank portion 15 provided on one end side in the rotational axis Z direction (see FIG. 2) and configured to be attached to the spindle 2 of the machine tool 1, a chuck portion 17 provided on the other end side in the rotational axis Z direction and configured to allow attachment of the tool 5 thereto and a flange-like portion 19 (an example of an "intermediate portion") between the shank portion 15 and the chuck portion 17. The shank portion 15 and the chuck portion 17 are formed with tapering toward the respective leading ends thereof. To the chuck portion 17 of the tool holder 10, the tool 5 will be attached via e.g. a shrink fit, a collet chuck, etc. Alternatively, the tool 5 can be attached as an "insert tip" to the tool holder 10.

In the flange-like portion 19, at an end face 19a thereof on the side of the chuck portion 17 and on a same circumference centering about the axis of the tool holder 10, there are provided 12 (twelve) screw holes 18 (an example of "insertion holes") with 30-degrees angular spacing therebetween. Each screw hole 18 is slanted to be closer to the axis as it extends toward the shank portion 15 side. The diameters and the depths of these twelve screw holes 18 are all the same. Each screw hole 18 includes a first hole portion 18a which is cylindrical and into which a screw member 41 will be inserted and assembled, and a second hole portion 18b which is tapered and formed continuously with the deep side of the first hole portion 18a. In the screw hole 18, into the second hole portion 18b thereof, a ball body 41 is inserted and the screw member 41 (an example of an "insertion member") is assembled in the first hole portion 18a, with the screw member 41 being placed in contact with the ball body 40. In order to prevent the screw member 41 from protruding from the end face 19a, a sum of the axial length of the ball body 40 and an axial length of the screw member 41 is set shorter than the depth of the screw hole 18. Further, a female screw portion of the first hole portion 18a is set with a sufficient length that allows clamping of the screw member 41 even after establishment of contact between this screw member 41 and the ball body 40.

The screw member 41, as shown in FIG. 6, is provided in the form of a "set screw", and a plurality of kinds of such screw members 41 are prepared with slightly different masses, namely, different lengths, from each other. Alternatively, the plurality of screw members 41 may be formed of different kinds of materials having different densities, with a same length, thus rendering the masses thereof different from each other.

In the plurality of screw holes 18 of the tool holder 10, screw members 41a having a predetermined mass are screwed in advance. Under this condition, a test is conducted on the rotary tool 11 by a balancing machine. Then, based on its result, it is possible to adjust the dynamic mass balance at the time of rotation of the rotary tool 11.

In case it is found as the result of the test on the rotary tool 11 by the balancing machine that imbalance exists in the mass of the rotary tool 11, this imbalance will appear as runout of the rotary tool 11 in the radial direction. As a result, the balancing machine will show an angle of the unbalanced portion from a reference point in the rotation phase and a mass of adjustment diameter relative to the rotational axis Z. Then, in order to render the maximum runout amount of the rotary tool 11 as close as possible to zero, in place of the screw member 41a having the predetermined mass, a screw member 41 having a mass different therefrom will be threaded (screwed) in the screw hole 18. In this way, the dynamic mass balance at the time of rotation of the rotary tool 11 is adjusted.

[Imaging Device]

As shown in FIG. 1, the imaging device 20 consists essentially of an imaging section 21 and a controller 22 (an example of a "calculating section"). The imaging section 21 includes a beam (optical beam or light) projecting portion 23 for emitting an irradiation beam (light) toward the tool 5, an image sensor 24 configured to receive the irradiation beam for imaging the tool 5, and an objective lens 25 and an imaging lens 26 which form an image of the tool 5 as an imaging target on the beam receiving face of the image sensor 24. The beam projecting section 23 is constituted of e.g. a light emitting diode (LED), etc. The imaging sensor 24 is configured to receive the irradiation beam via a mirror 27. The imaging section 21 includes a control board as a controlling section 28 for executing imaging operations by the image sensor 24 by a predetermined time interval. The controlling section 28 includes a trigger circuit 29 for executing the imaging operations.

The controller 22 is configured to be capable of effecting processing of data such as captured images of the machine tool 1 and the imaging device 20 as well as inputting operations of various kinds of data such as the number of blade portions 5A (blade number) included in the tool 5, a rotational speed for imaging to be described later, etc. A phase detecting section 31 includes a photoelectric sensor for detecting the first mark 3 provided on the spindle 2 and is used for detecting the reference point (the portion having zero rotational angle) of the rotation phase of the spindle 2. Upon detection of the first mark 3 by the phase detecting section 31, a detection signal will be transmitted from the phase detecting section 31 to the controlling section 28.

In the balance and runout adjustment system 100, the balance and runout of the rotary tool 11 are adjusted by following steps.

The imaging section 21 of the imaging device 20 will be mounted to the machine tool 1. The tool holder 10 (rotary tool 11) comprised of the tool 5 having the plurality of blade portions 5A will be mounted on a spindle 2 of the machine tool 1. In doing this, the position of the reference point (first mark 3, second mark 4) of the spindle 2 of the machine tool 1 will be brought into alignment with the position of a tool reference point (third mark 13) of the tool holder 10.

In succession, with using the balance determining device (the imaging device 20 in the case of the instant embodiment), the mass balance of the rotary tool 11 in the course of its rotation is determined (balance determining step). Thereafter, based on the mass balance of the rotary tool 11 determined by the balance determining device, balance adjustment will be effected on the tool holder 10 (rotary tool 11) with this tool holder 10 being kept attached to the spindle 2 of the machine tool 1 (balance adjusting step).

Next, with using the runout determining device (the imaging device 20 in the case of the instant embodiment), a runout amount of the tool 5 (rotary tool 11) at the time of rotation is determined (runout determining step). Thereafter, based on the runout amount determined by the runout determining device, runout adjustment is effected on the tool holder 10 (rotary tool 11) with this tool holder 10 being kept attached to the spindle 2 of the machine tool 1 (runout adjusting step).

With the above-described configuration, at the time of or in the course of rotation of the rotary tool 11, the mass balance of the rotary tool 11 can be determined with using the imaging device 20 and also the runout amount of the tool 5 (blade portions 5A) included in the rotary tool 11 can be determined. Thus, the mass balance and the runout amount of the rotary tool 11 can be easily determined. Moreover, since the adjustments of the mass balance and the runout amount of the rotary tool 11 are effected via the tool holder 10 as being kept attached to the spindle 2 of the machine tool 1, these adjustments of the mass balance and the runout amount of the rotary tool 11 based on the determined results can be effected easily and with high precision.

Next, the specific contents of the balance determining step, the balance adjusting step, the runout determining step and the runout adjusting step will be explained.

(Balance Determining Step and Balance Adjusting Step)

In the instant embodiment, the balance determining step is effected with using the imaging device 20. Specifically, the imaging sensor 24 images (i.e. picks up an image of) the rotary tool 11 and then based on the obtained image of the rotary tool 11, "outer circumferential position data" (runout amount in the radial direction) of the rotary tool 11 will be acquired and with using the controller 22 (calculating section), mass balance of the rotary tool 11 will be determined from the resultant outer circumferential position data. The irradiation beam from the beam projecting section 23 will be caused to be irradiated on the rotary tool 11 by either elevating the imaging device 20 or lowering the spindle 2 together with the phase detecting section 31.

More particularly, the irradiation beam from the beam projecting section 23 will be irradiated onto the cylindrical portion (e.g. the chuck portion 17) of the tool holder 10 at the time of rotation, and then based on runout of this cylindrical portion, the mass balance of the rotary tool 11 will be determined. This determination of runout of the rotary tool 11 by the imaging device 20 is effected by either a dividing imaging (dividing shooting) method or a delayed imaging (delayed shooting) method. The dividing imaging method is the imaging method to be employed at the time of low speed rotation and the delayed imaging method is the imaging method to be employed at the time of high speed rotation. The dividing imaging method and the delayed imaging method will be described in details in the following description of the runout determining step.

Figure 7:
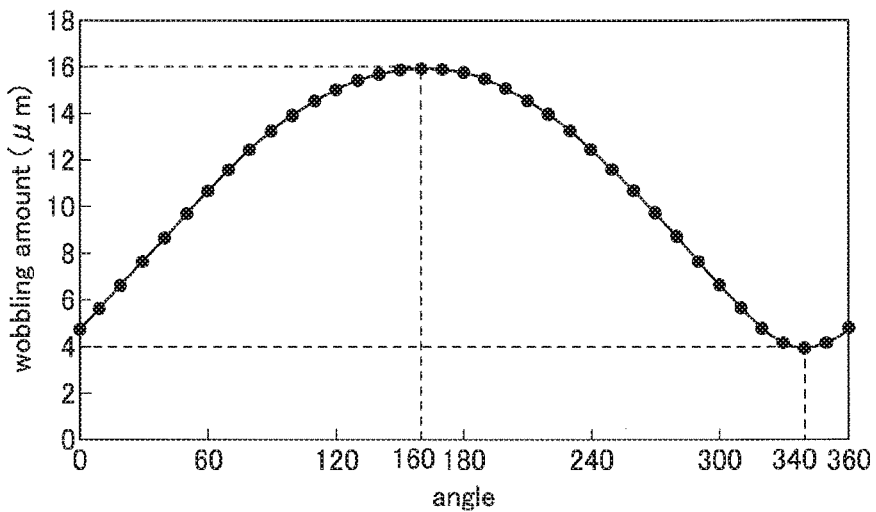
FIG. 7 is a graph showing runout amounts of the rotary tool for respective rotational angles.
Figure 8:
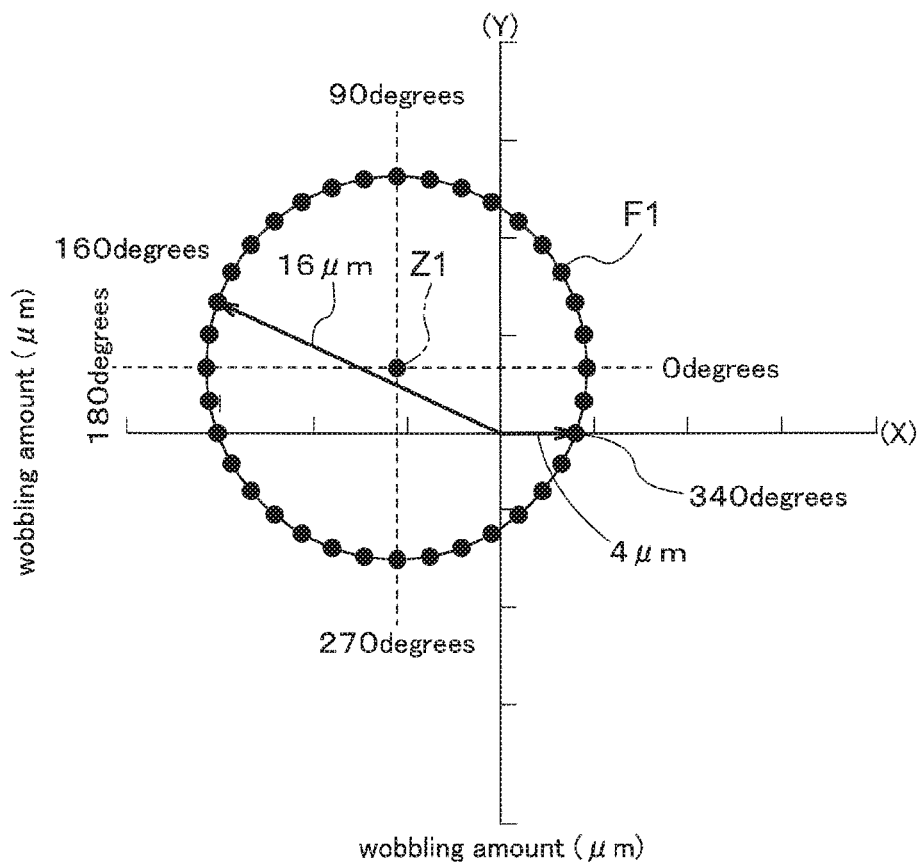
FIG. 8 is a view showing runout amounts of the rotary tool for respective rotational angles mapped on a X-Y coordinate system.

With using the imaging device 20, runout amounts per predetermined rotational angle in one whole circumference of the cylindrical portion (chuck portion 17) of the rotary tool 11 are determined. FIG. 7 shows an example of determination result. From this illustration, it is understood that the runout amount becomes the maximum of 16 μm when the rotational angle is 160 degrees and becomes the minimum of 4 μm when the rotational angle is 340 degrees. FIG. 8 shows the result of FIG. 7 mapped on an X-Y coordinate system. Specifically, the minimum runout amount (340 degrees, 4 μm) was set as a predetermined position in the positive direction on the X axis from the origin of the X-Y coordinate system. Then, based on this position as the reference, the runout amounts of all angles were mapped on the X-Y coordinate system. The distance from the origin of the X-Y coordinate system to each point represents the runout amount. In FIG. 8, the positive direction of the X axis on the X-Y coordinate system was set as the reference point (0 degree) of the rotation phase of the rotary tool 11. In FIG. 8, the center position of the runout displacements of the circumferential portions of the rotary tool 11 are shown as Z1.

Figure 9:
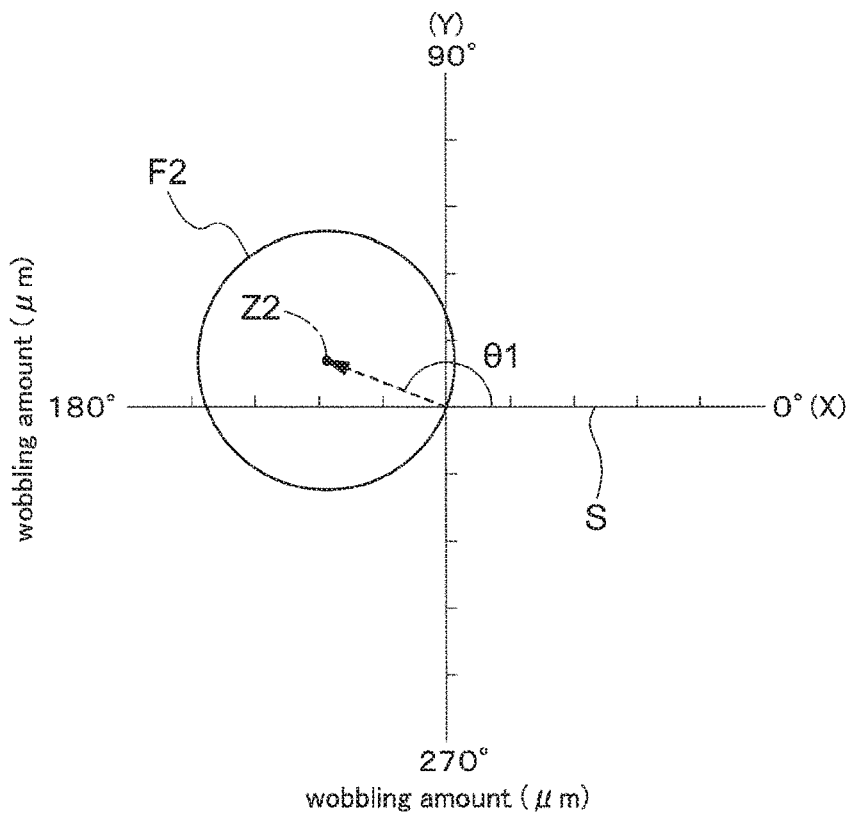
FIG. 9 is a view in which the minimal value of the runout amount shown in FIG. 8 is shifted to the origin, a flowchart showing a runout determining process.

Next, the runout amounts of the respective rotational angles were re-calculated with aligning the minimum value of the runout amount (340 degrees, 4 μm) with the origin of the X-Y coordinate system. Specifically, each point constituting the circle shown in FIG. 8 was shifted by 4.0 μm to the negative direction side of the X axis. The re-calculated runout amount of each rotational angle can be mapped in the graph shown in FIG. 9. As shown in this FIG. 9, the center position of runout displacements of the rotary tool 11 is moved from Z1 to Z2. The coordinates of Z2 can be calculated by averaging X values and Y values respectively of the runout amounts of angles different by 180 degrees in the rotation phase. In the example shown in FIG. 9, the position Z2 is a position having a counterclockwise angle θ1 of 160 degrees relative to the origin of the X-Y coordinate system as the center, on the premise of a positive portion of the X axis extending from the origin of the X-Y coordinate system being the reference line (to be referred to as "reference line S" hereinafter) with 0 degree angle relative to the origin of the X-Y coordinate system. Further, the magnitude of the vector from the origin of the X-Y coordinate system to the position Z2 is 10 μm. The angle θ1 representing the direction of this vector is the rotational angle where the runout amounts shown in FIG. 7 become the maximum and the minimum and its magnitude is the average of the maximum and minimum values of the runout amounts at that angle. Hereinafter, this vector will be referred to as vector V1.

Figure 10:
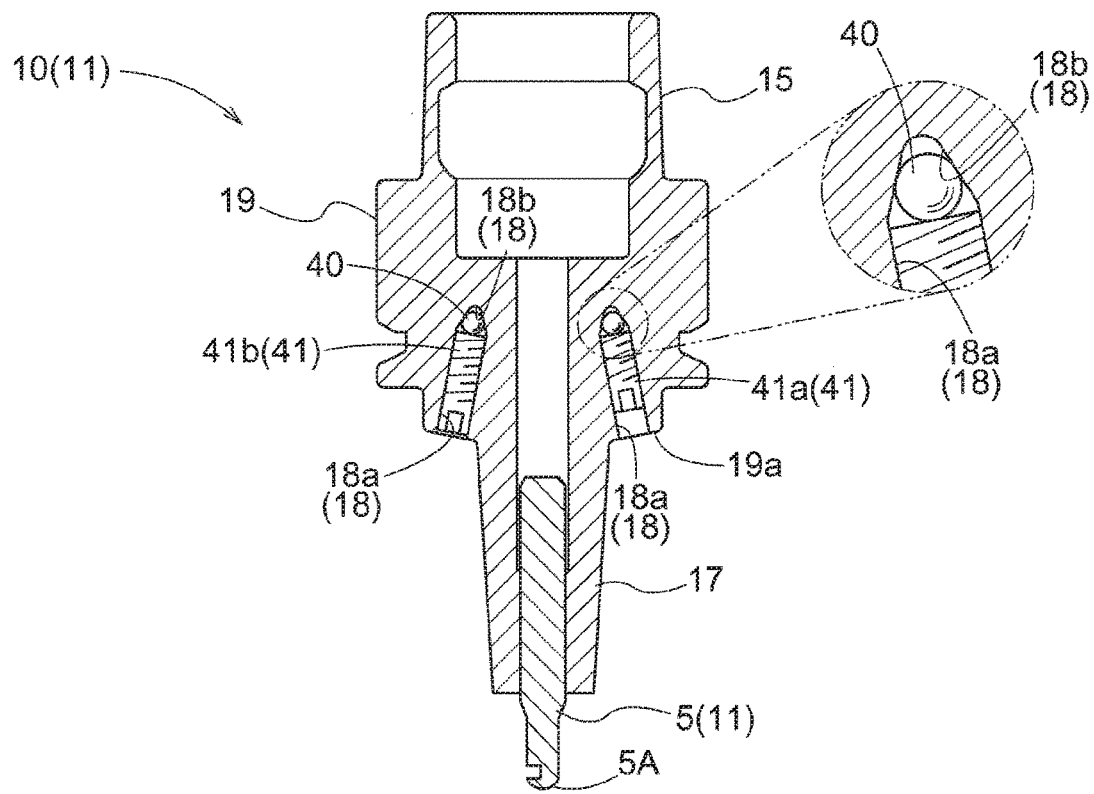
FIG. 10 is a side view in section showing a condition of a trial weight being added to the tool holder.

Here, for the rotary tool 11 having the position Z2 as its rotational center, influence to its mass balance given by a "trial weight" will be obtained by adding a trial weight to the tool holder 10. Specifically, as illustrated in FIG. 10, of the screw holes 18 distributed at 12 (twelve) positions in the circumferential direction of the tool holder 10, from a screw hole 18 at one position (e.g. No. 0, 0 degree), the standard screw member 41*a* will be pulled out and instead a screw member 41*b* with a trial weight (e.g. 200 mg) added to the mass of the screw member 41*a* will be assembled therein. Thereafter, the rotary tool 11 will be rotated at the same rotational speed and change occurring in runout of the rotary tool 11 will be determined.

Figure 11:
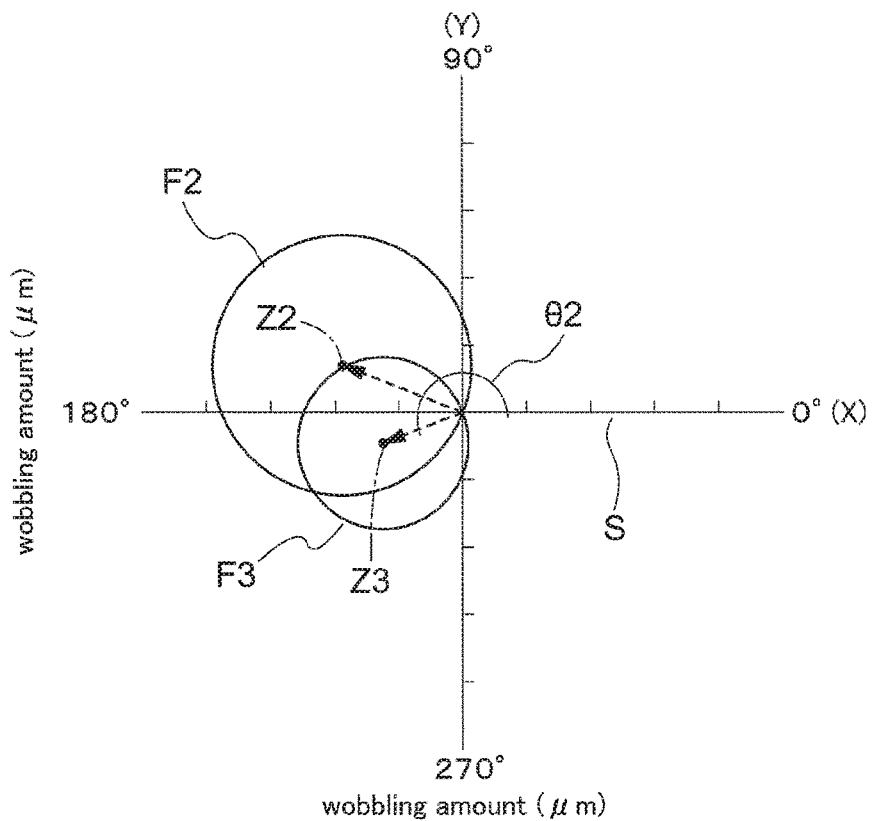
FIG. 11 is a view showing the position of a rotational center which has been displaced by addition of the trial weight to the tool holder.

Suppose the addition of the trial weight resulted in shifting from Z2 to Z3 in the center position of runout displacements of the tool holder 10 (see FIG. 11). The position Z3 is the position having a counterclockwise angle θ2 of 200 degrees from the reference line S. Let us suppose also that the magnitude of the vector from the origin of the X-Y coordinate system to the position Z3 is 6.5 μm, which is reduced from the magnitude of 10 μm of the vector from the origin of the X-Y coordinate system to the position Z2. Hereinafter, this vector will be referred to as the vector V2.

Figure 12:
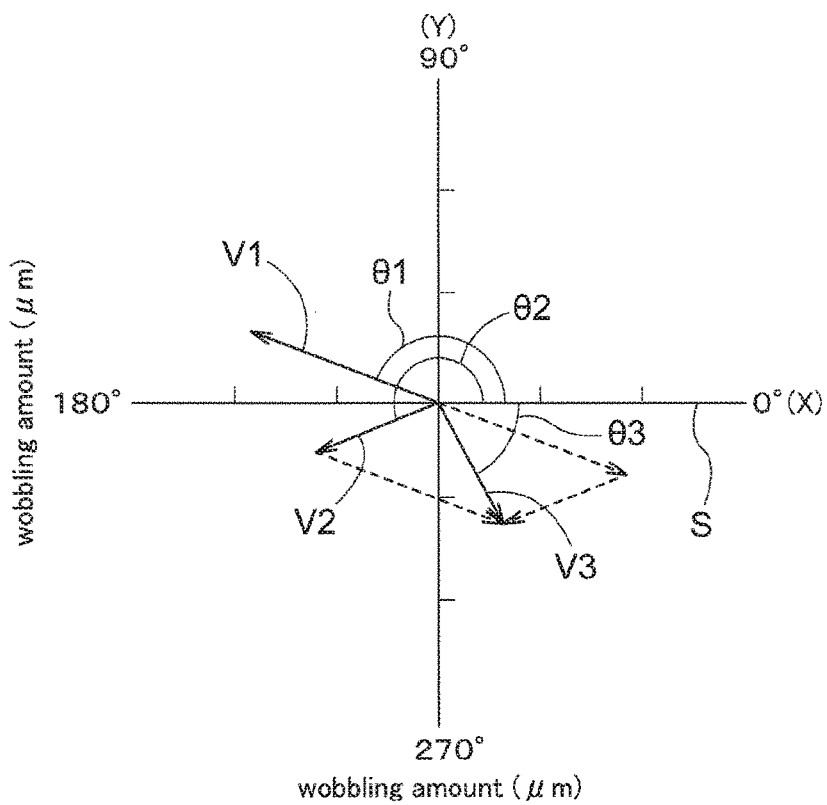
FIG. 12 is a view showing vectors which are applied as the result of the addition of the trial weight to the tool holder.

The influences of trial weights that result in shifting of the runout center position of the rotary tool 11 are shown in FIG. 12. Runout generated by a trial weight can be obtained as vector V3 by vector calculation based on the vector V1 and the vector V2. As the sum of the vector V1 and the vector V3 is the vector V2, the vector V3 can be obtained by subtracting the vector V1 from the vector V2.

In the vector V3 indicative of the influence of trial weight, an X component V3x can be represented by Formula 1 below.

$$V3x = V2\cos\theta 2 - V1\cos\theta 1 = 3.29 \quad \text{[Formula 1]}$$

Also, the y component V3y can be represented by Formula 2 below.

$$V3y = V2\sin\theta 2 - V1\sin\theta 1 = -5.64 \quad \text{[Formula 2]}$$

From the above, a clockwise angle θ3 from the reference line S to the vector V3 and the magnitude of the vector V3 can be calculated respectively by Formula 3 and Formula 4 below.

$$\theta 3 = \tan^{-1}(V3y/V3x) \quad \text{[Formula 3]}$$

$$V3 = \sqrt{(V3x)^2 + (V3y)^2} \quad \text{[Formula 4]}$$

In the example shown in FIG. 12, the angle θ3 is −59.8 degrees and the magnitude of the vector V3 is 6.5 μm.

Figure 13:
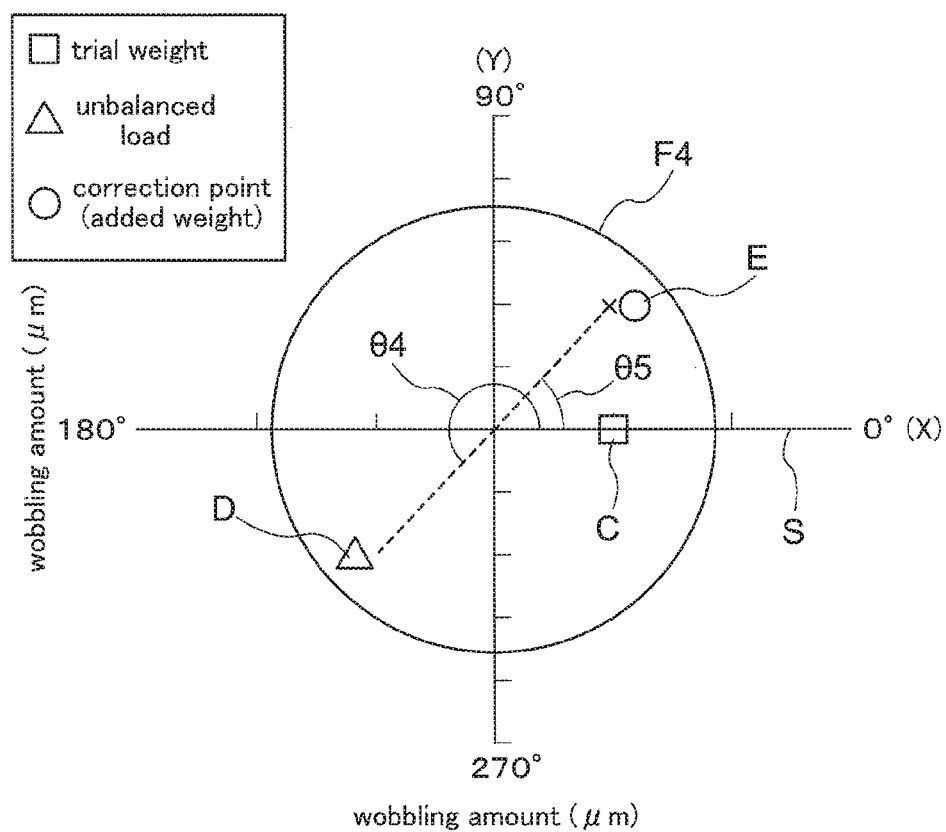
FIG. 13 is a view showing an unbalanced position provided by the trial weight and a position of a correction weight.

FIG. 13 shows the position of the trial weight C, the position of an offset load D and a position (correction position) E for correcting the unbalanced (eccentric) load of the rotary tool 11 by addition of the offset load D. From the relationship between the vector V3 indicative of the influence of the trial weight C and the position of the trial weight C (No. 0, 0 degree), the unbalanced load D of the rotary tool 11 is calculated by Formula 5 below. Here, the unbalanced load D is defined as a load of such magnitude that generates imbalance in the rotary tool 11 in the course of its rotation.

$$\text{unbalanced load } D = \qquad \text{[Formula 5]}$$
$$((\text{magnitude of vector } V1/\text{magnitude of vector } V3) \times$$
$$\text{mass of trial weight}) = 30.8 \text{ mg}.$$

In the circumferential direction of the rotary tool 11, the position of the unbalanced load D is the position having an angle $\theta 4$ from the reference line S and the angle $\theta 4$ is calculated by Formula 6 below $$\text{[Formula 6]}$$
$$\theta 4 = (\text{angle } \theta 1 \text{ of vector } V1 - \text{angle } \theta 3 \text{ of vector } V3) = 219.8 \text{ degrees}$$

The unbalanced load D shown in FIG. 13 is the position where the unbalanced load D exists in the rotary tool 11. Therefore, by removing the unbalanced load D from the tool holder 10 for example, the runout amount of the rotary tool 11 becomes minimum. In place of this, in case the unbalanced load D is to be offset by addition of a balance correction weight to the tool holder 10, the weight will be added to the position E shown in FIG. 13. This position E is the position having an angle $\theta 5$ from the reference line S which is at the position in symmetry with the angle $\theta 4$ relative to the origin; and the angle $\theta 5$ is calculated by the following Formula 7 below.

$$\theta 5 = \theta 4 = 180 \text{ degrees} \qquad \text{[Formula 7]}$$

In the case of the example shown in FIGS. 7 through 12, in FIG. 13, the unbalanced load D is 308 mg and the angle $\theta 4$ from the reference line S to the position of the unbalanced load D is 219.8 degrees. Therefore, the angle $\theta 5$ from the reference line S to the position E becomes 39.8 degrees. The screw holes 18 are provided with 30 degree angular spacing therebetween in the circumferential direction of the tool holder 10. Therefore, by addition of the load (308 mg) to offset the unbalanced load D to e.g. No. 1 screw hole 18 and No. 2 screw hole 18 in distribution, the mass balance of the rotary tool 11 can be adjusted appropriately. With this, the balance adjustment of the rotary tool 11 is completed.

(Runout Determining Step)

By the imaging device 20, runout amounts of the rotary tool 11 are determined.

Specifically, in the course of rotation of the rotary tool 11, the image sensor 24 of the imaging device 20 images (captures the images of) the rotary tool 11 and based on the obtained images of the rotary tool 11, "shape data" of the blade portions 5A of the tool 5 (rotary tool 11) is obtained and with using the controller 22 (calculating section), from this shape data, the runout amount of the blade portion 5A (rotary tool 11) is determined.

The imaging device 20 effects the determination of the runout amounts of the plurality of blade portions 5A of the rotary tool 11 with using either the dividing imaging method or the delayed imaging method described above. The dividing imaging method is an imaging technique for effecting a plurality of times of imaging operations during one rotation of a rotary body. On the other hand, the delayed imaging method is an imaging technique in which with use of an imaging cycle set slightly longer than the rotation cycle of the rotary body (one rotation cycle or plural rotation cycles), there is provided a stroboscopic effect to image the rotary body.

If the rotary tool 11 is used at a low rotational speed and the rotation cycle of the rotary tool 11 is equal to or greater than 2 folds of the maximum imaging cycle of the image sensor 24 (camera), the image sensor 24 can effect a plurality of times of imaging operations during one rotation of the rotary tool 11. For this reason, in this case, by using the dividing imaging technique, the imaging device 20 can effect determination of runout amounts of the plurality of blade portions 5A of the rotary tool 11.

On the other hand, in case the rotary tool 11 is rotated at a high rotational speed and the rotation cycle of the rotary tool 11 is less than two folds of the maximum imaging cycle of the image sensor 24 (camera), the image sensor 24 cannot effect a plurality of imaging operations during one rotation of the rotary tool 11. Thus, in this case, the imaging device 20 will effect determination of the runout amounts of the plurality of blade portions 5A of the rotary tool 11 with using the delayed imaging technique instead of the dividing imaging technique. In this way, with selective use of two kinds of imaging techniques, the determination of runout amounts of the plurality of blade portions 5A of the rotary tool 11 can be effected effectively.

Figure 14:
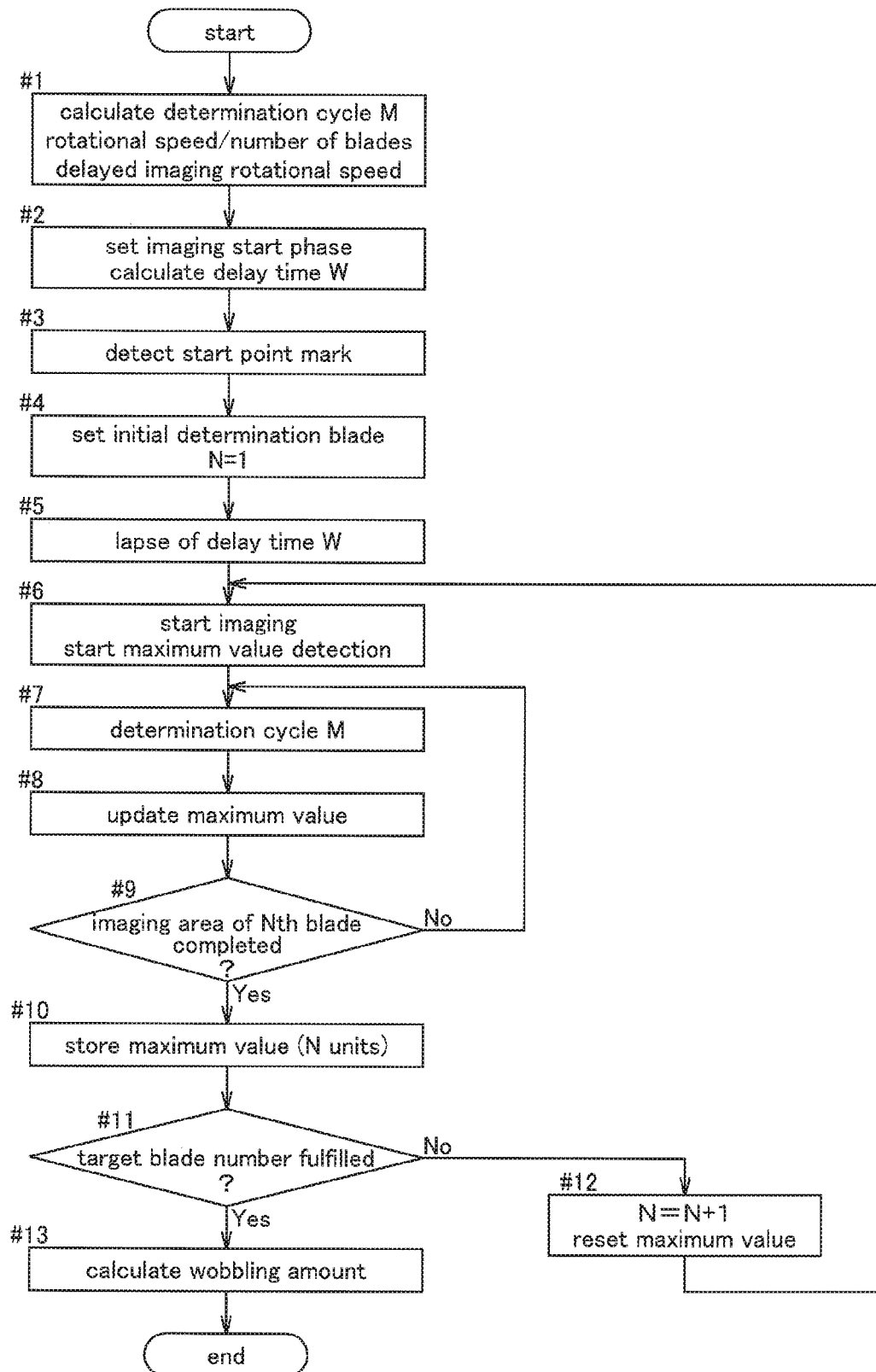
FIG. 14 is a flowchart showing a runout determining process.

In order to effect a high precision machining such as a mirror face machining on e.g. a precision metal mold by the rotary tool 11, it is necessary to rotate this rotary tool 11 having the blade portions 5A at a high speed. Then, in the following, with reference to the flowchart shown in FIG. 14, a runout determining step of the rotary tool 11 with using the delayed imaging technique will be explained. At the runout determining step by the delayed imaging technique, the plurality of blade portions 5A will be assigned with respective ID numbers (e.g. 5A1, 5A2, . . . n) in this order based on a determined start point and the tool 5 (rotary tool 11) will be rotated continuously by a predetermined cycle, determination of runout displacements of the plurality of blade portions 5A will be effected. FIGS. 15 through 20 show transition of the rotation phase of the tool 5 (rotary tool 11) relative to the phase detecting portion 31 at the runout determining step.

At step #1, a determination cycle M is calculated. As one example, let us suppose a case in which the rotary tool 11 as the determination target is rotated at 5000 rpm and it has two blade portions 5A. In this case, the rotation cycle of the rotary tool 11 becomes 12.00 milliseconds. Incidentally, here it is assumed that the minimum imaging interval time (the reciprocal of the maximum frame rate) of the camera having the image sensor 24 is 12.67 milliseconds. In this case, since the rotation cycle of the rotary tool 11 is less than two folds of the minimum imaging interval time of the camera, the delayed imaging technique will be implemented for determination of the runout amounts of the blade portions 5A of the rotary tool 11.

In the delayed imaging technique, a rotational speed (to be referred to as "delayed imaging rotational speed" hereinafter) for delaying the imaging timing of the image sensor 24 relative to the rotation cycle of the rotary tool 11 will be set by the controller 22. With this, the initial imaging rotational speed is calculated with using Formula 8 below.

$$\text{initial imaging rotational speed} = \\ \text{rotational speed of rotary tool} - \text{delayed imaging rotational speed}$$

[Formula 8]

For example, if the delayed imaging rotational speed is 5 rpm, then, the initial imaging rotational speed will become 4995 rpm.

Here, 4995 rpm calculated as the initial imaging rotational speed is converted to an imaging interval time of 12.01 milliseconds, which is shorter than the minimum imaging interval time of 12.67 milliseconds of the image sensor 24. Therefore, it is not possible to use the imaging interval time of the image sensor 24 as the delayed imaging cycle (12.01 milliseconds). Then, 12.01 milliseconds, the imaging cycle converted from the initial imaging rotational speed, is multiplied by an integer ("2" in the instant embodiment) which gives a value greater than or equal to the minimum imaging interval time (12.67 milliseconds) of the imaging sensor 24. With this, the imaging interval time of the image sensor 24 is set now to a time (24.02 milliseconds) which is slightly longer than two-rotation cycles of the rotary tool 11, whereby the runout amounts of the blade portions 5A can be determined appropriately. The imaging operation by the image sensor 24 is executed in response to output of a trigger signal from the trigger circuit 29 included in the controlling section 28 to the camera including the image sensor 24.

Next, at step #2, an imaging start phase is set based on the position of the first mark 3 as the start point. And, a delay time W until start of the initial imaging operation is calculated. In this embodiment, the imaging start phase is set to 0.75 turn (rotation) and the delay time W is set to 9 milliseconds.

At step #3 through step #13, the runout amounts of the blade portions 5A of the tool 5 are determined.

Figure 15:
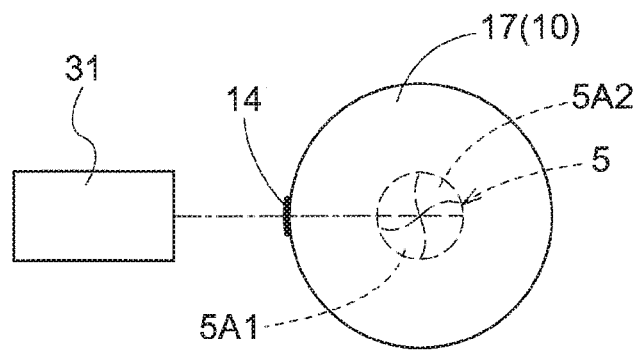
FIG. 15 is a view showing positional relation between a blade portion of a tool and a phase detecting section.
Figure 16:
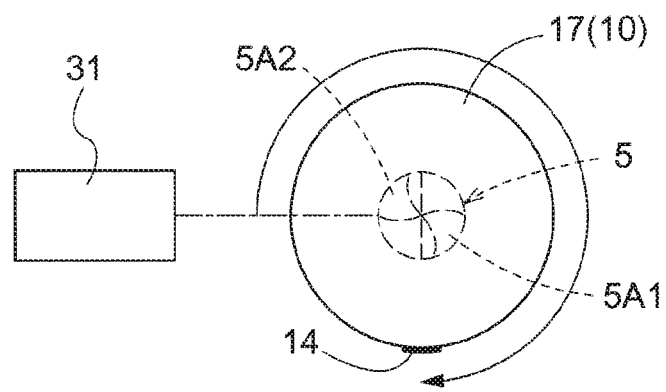
FIG. 16 is a view showing positional relation between a blade portion of a tool and a phase detecting section.

At step #3, the first mark 3 (fourth mark 14) as the start point is detected by the phase detecting section 31 (see FIG. 15). At step #4, the blade portion 5A1 is set as the initial determination blade (N=1). Then, an imaging operation is started after lapse of the delay time W and the process starts detection of a maximum value of the positions of the blade portion 5A1 (the distances from the rotational axis Z of the rotary tool 11 to the outer face of the blade portion 5A) (step #5, step #6, see FIG. 16). FIG. 16 shows a rotation phase of the tool 5 (rotary tool 11) upon start of the imaging of the blade portion 5A1.

Figure 17:
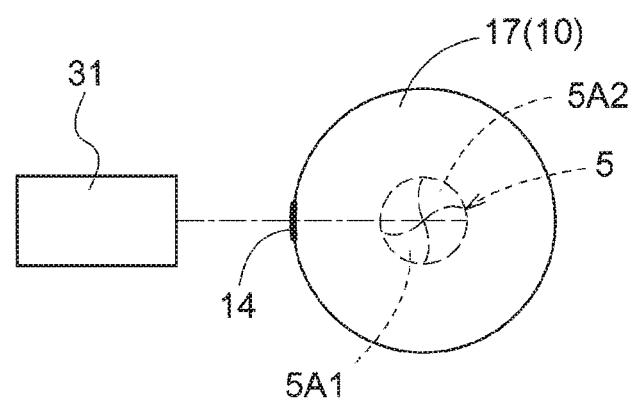
FIG. 17 is a view showing positional relation between a blade portion of a tool and a phase detecting section.
Figure 18:
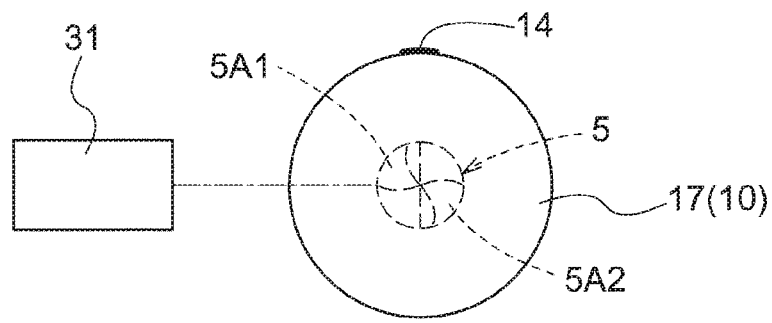
FIG. 18 is a view showing positional relation between a blade portion of a tool and a phase detecting section.
Figure 19:
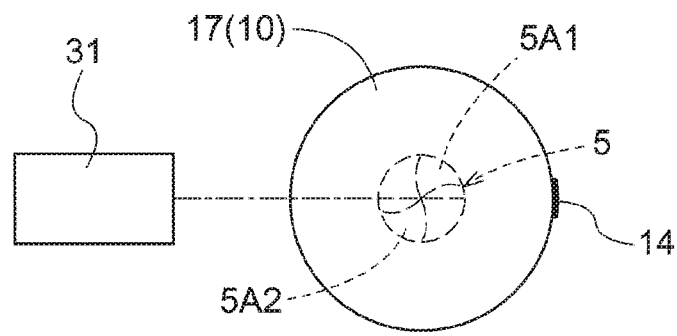
FIG. 19 is a view showing positional relation between a blade portion of a tool and a phase detecting section.
Figure 20:
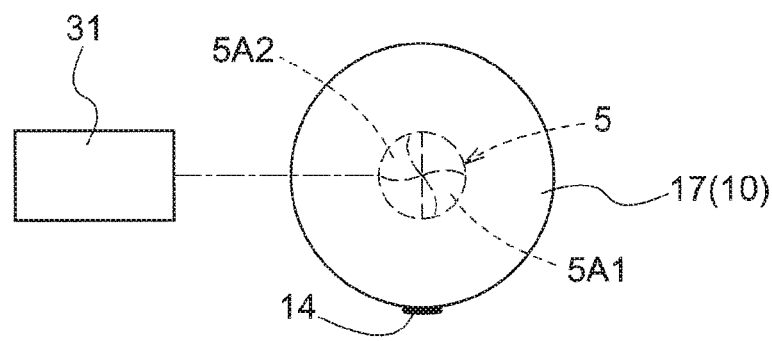
FIG. 20 is a view showing positional relation between a blade portion of a tool and a phase detecting section.

As the imaging by the determination cycle M is continued, the maximum value of the positions of the blade portion 5A1 is updated (revised) at any time (step #7, step #8). FIG. 17 shows a rotation phase of the tool 5 at time of completion of a half of the imaging area of the blade portion 5A1. At step #9, the process checks whether the imaging of the imaging area of the blade (blade portion 5A1) in the N'th order (e.g. the first one) is completed or not. If the imaging of the imaging area is not yet completed, the process returns to step #7 and the imaging of the blade portion 5A1 is continued. When the imaging of the imaging area of the blade portion 5A1 is completed, the maximum value of the position of the blade portion 5A1 is recorded (step #10). This maximum value of the position of the blade portion 5A1 will be stored in the controlling section 28 of the imaging section 21 or in an unillustrated calculating section provided in the controller 22. At step #10, the respective maximum values of the number of blades (N units) of the blade portions 5A are stored. FIG. 18 shows a rotation phase of the tool 5 upon start of the imaging of the blade portion 5A2. FIG. 19 shows a rotation phase of the tool 5 at time of completion of a half of the imaging area of this blade portion 5A2. FIG. 20 shows a rotation phase of the tool 5 upon completion of the entire imaging operation of the imaging area of the blade portion 5A2.

At step #11, the process checks whether the imaging operation has been completed for the target number of blades N or not. If the operation for the target number of blades N has not yet been completed, the maximum value of the position of the blade portion 5A1 will be reset and determination on the next blade (the blade portion 5A2 in this embodiment) is effected (step #12, step #6). On the other hand, if the completion of the operation for the target number of blades N is completed at step #11, at step #13, runout amounts of the plurality of blade portions 5A of the rotary tool 11 are calculated.

Figure 21:
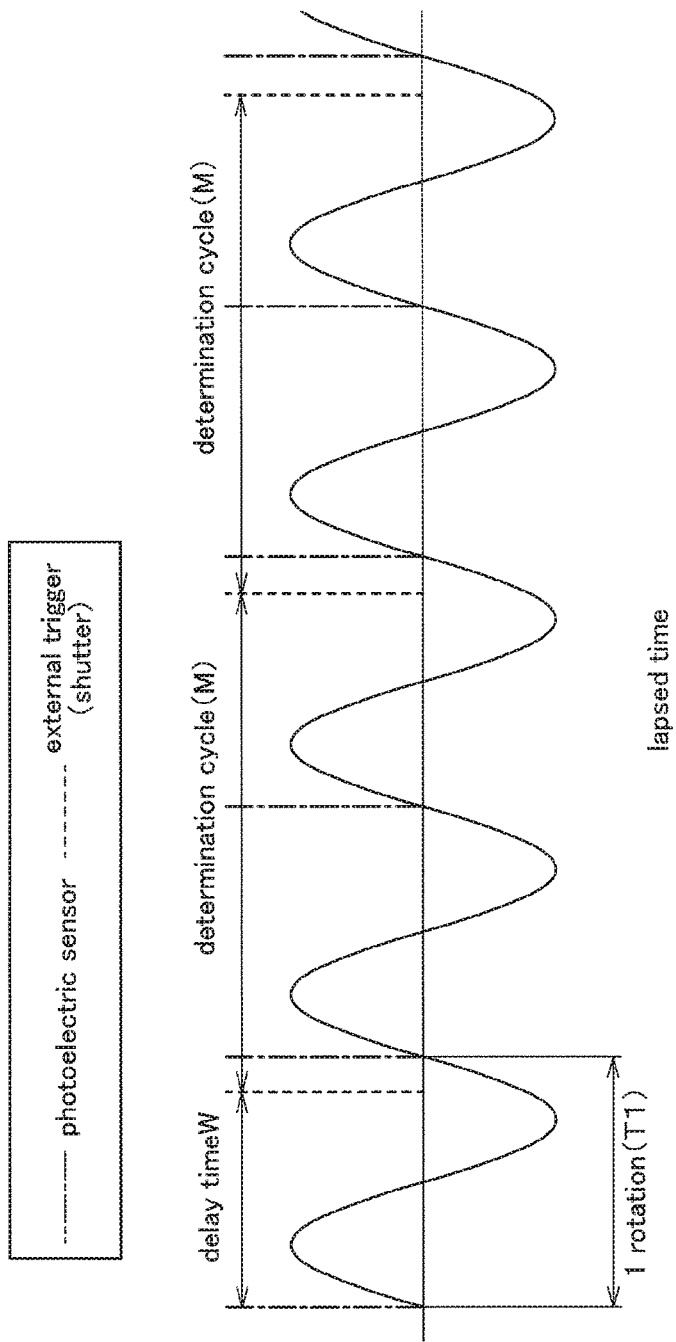
FIG. 21 is a graph showing a determination cycle.

FIG. 21 shows a relation between the rotation waveform (sine waveform) of the rotary tool 11 and the determination cycle M of the position of the blade portion 5A of the rotary tool 11 (imaging interval time of the image sensor 24). When the phase detecting section 31 detects the first mark 3 and then upon lapse of the delay time W thereafter, an external triggering from the trigger circuit 29 is activated, whereby a shutter (not shown) of the camera including the image sensor 24 is opened and closed. With this, the first imaging of the tool 5 of the rotary tool 11 by the image sensor 24 is effected. Thereafter, after lapse of every determination cycle M, an imaging by the image sensor 24 will be repeated.

[Runout Adjusting Step]

Based on the determination results of the runout determining step, the runout amounts of the plurality of blade portions 5A of the rotary tool 11 are adjusted. Specifically, in the tool holder 10, the clamping amount(s) of the screw member(s) 41 assembled in one or some of the screw holes 18 will be adjusted. More particularly, such screw member 41 will be clamped progressively toward the bottom face of the screw hole 18. With this, the ball body 40 placed in contact with the leading end face of the screw member 41 presses the bottom portion of the screw hole 18 (the inner face of the second hole portion 18b). The screw hole 18 is slanted to be closer to the axis of the tool holder 10 as it extends toward the base end side of the tool holder 10. Therefor, in response to the clamping of the screw member 41, the leading end of the chuck portion 17 will receive a reaction force of the screw member 41 which acts on the base end portion of the tool holder 10.

With the above, in the chuck portion 17, a portion thereof extending from the portion of the screw hole 18 in which the screw member 41 is clamped to the leading end becomes deformable to the radially outer side. By appropriately changing the clamping amounts of the screw member(s) 41 selected from the screw members 41 assembled in the plurality of screw holes 18, adjustment is made possible for minimizing the runout amounts of the plurality of blade portions 5A in the rotary tool 11.

Here, preferably, in the axial direction of the screw member 41, the contact area between the screw member 41 and the ball body 40 should be as small as possible. With decrease of the contact area between the screw member 41 and the ball body 40 in the axial direction, the contact resistance between these two members becomes smaller correspondingly. Namely, the efficiency of pressing is improved when the ball body 40 is pressed by the screw member 41 by tightening of this screw member 41. This in effect can increase the pressing force exerted by the ball body 40 to the bottom portion of the screw hole 18, so that the deformation amount of the chuck portion 17 can be increased easily. For the purpose of decreasing the contact area between the screw member 41 and the ball body 40, alternatively, a protruding portion having a smaller diameter than the main body of the screw member 41 may be provided at the leading end side axial portion of the screw member 41, for instance.

SECOND EMBODIMENT

In this embodiment, the delayed imaging technique used at the runout determining step differs from that used in the first embodiment whereas the rest of the configuration is identical to the first embodiment.

Figure 22:
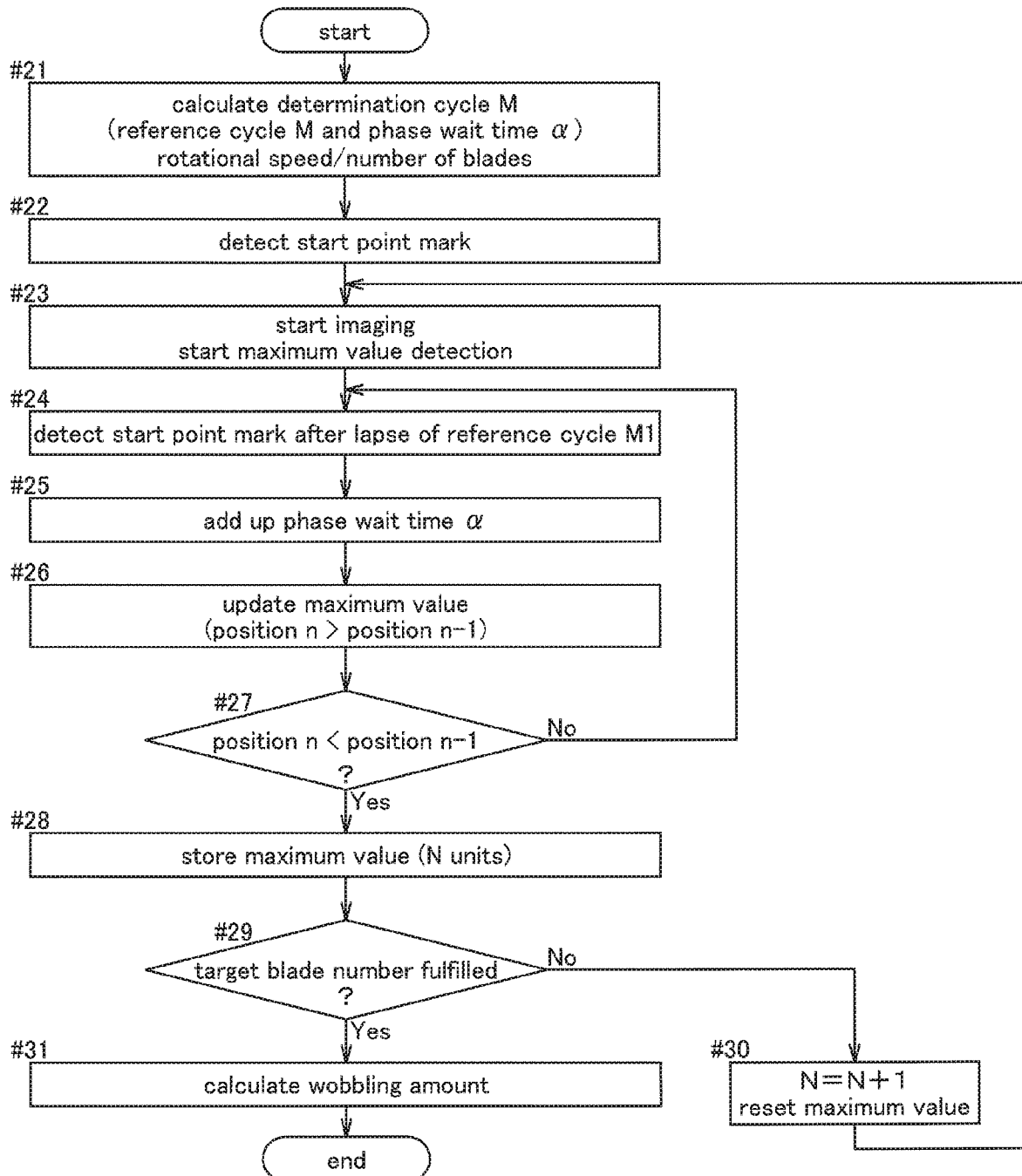
FIG. 22 is a flowchart showing a runout determining process relating to a second embodiment.

The runout determination of the rotary tool 11 by the delayed imaging technique in this embodiment is effected in accordance with a flowchart shown in FIG. 22. Specifically, the following steps are effected. For the plurality of blade portions 5A, based on a set start point, ID serial numbers will be assigned to the respective blade portions 5A (e.g. 5A1, 5A2, . . . n) in this order and the tool 5 is rotated continuously, and determination of the positions of the blade portions 5A will be effected with setting the determining cycle M (imaging interval time) longer than the rotation cycle (reference cycle M1).

At step #21, the process calculates a reference cycle M1 and a "phase wait time ($\alpha$)" which is to be added upon lapse of each reference cycle M1 after detection of the first mark 3 as the start point by the phase detecting section 31. In case the rotary tool 11 as the determination target is rotated at 5000 rpm and there are provided two blade portions 5A, like the example disclosed in the first embodiment, the reference cycle M1 will be a cycle in which the rotary tool 11 is rotated two turns (24 milliseconds) and the phase wait time ($\alpha$) can be calculated by the following Formula 9 below.

$$\text{phase wait time } (\alpha) = \text{(one rotation cycle of rotary tool)/(the number of imaging operations per rotation of the rotary tool)}. \quad [\text{Formula 9}]$$

For instance, in case the rotary tool 11 is imaged one time for each 1 degree rotation angle, the one rotation cycle 12 milliseconds and the imaging times 360 times will be substituted in Formula 9. With this, there is obtained a phase wait time ($\alpha$) of 0.033 millisecond.

At steps #22 through #30, the positions of the plurality of blade portions 5A of the tool 5 (the distances from the rotational axis Z of the rotary tool 11 to the outer faces of the blade portions 5A) are determined. At step #22, upon detection of the first mark 3 as the start point by the phase detecting section 31, the imaging operation by the image sensor 24 is started and detection of the maximum value of the positions of the blade portion 5A1 is started.

At step #24, after lapse of the reference cycle M1, upon detection of the first mark 3 as the start point by the phase detecting portion 31, the phase wait time ($\alpha$) is added up (step #25). For example, in the case of the second imaging, the phase wait time is ($\alpha$). In the case of the third imaging, the phase wait time becomes 2$\alpha$ (see FIG. 23). At step #26, the maximum value of the position of the blade portion 5A1 is updated at any time if needed. Specifically, the maximum value will be updated if the value of the position (position: n) of the blade portion 5A1 determined is greater than the value of the position (position: n−1) determined immediately prior thereto. In the determination of the position of the blade portion 5A1, if the value of the position (position: n) becomes smaller than the value of the position (position: n−1) determined immediately before (step #27: Yes), the current maximum value is recognized as the cutting edge position having the peak value and will be recorded as such (step #28). At step #28, the maximum value of the number of blades (N units) of the blade portions 5A is stored. At step #28, if the condition: position (n)<(position n−1) is not satisfied (step #27: No), then, the process returns to step #24 to continue the imaging operation.

At step #29, fulfillment of the target number N is checked, if not fulfilled yet, determination of the next blade portion 5A (blade portion 5A2 in this embodiment) is effected (step #30, step #23). At step #29, if the fulfillment of the target number N is confirmed (or if the added-up value of the phase wait time ($\alpha$) becomes one rotation amount of the rotary tool 11), then, at step #31, the runout amounts of the plurality of blade portions 5A of the rotary tool 11 are calculated.

FIG. 23 shows a relation between the rotation waveform (sine waveform) of the rotary tool 11 and the determination cycle M of the position of the blade portion 5A of the rotary tool 11 (imaging interval time of the image sensor 24). FIG. 23 shows an example in which the position of the first mark 3 as the start point is the imaging start phase. Namely, the delay time W from the detection of the first mark 3 by the phase detecting section 31 to the start of the first imaging is zero (no phase wait).

As shown in FIG. 23, in the first imaging of the tool 5 by the image sensor 24, when a photoelectric sensor of the phase detecting section 31 detects the first mark 3, an external trigger from the trigger circuit 29 is activated immediately, whereby the shutter (not shown) of the camera including the image sensor 24 is opened and closed. The second imaging is effected after addition of the phase wait time ($\alpha$) to the reference cycle M1 (two-rotation cycle). Thereafter, at each time the photoelectric sensor of the phase detecting section 31 detects the first mark 3 at the reference cycle M1 (two-rotation cycle), the phase wait time ($\alpha$) is added. In this way, with setting the determination cycle M (imaging interval time) longer than the rotation cycle (reference cycle M1), the determination of the position of the tool 5 is effected. Alternatively, the determination may be made with detection of only a predetermined determination cycle M longer than the rotation cycle (reference cycle M1), without addition of the phase wait time ($\alpha$) on each occasion of detection of the first mark 3.

OTHER EMBODIMENTS (1) The balance and runout adjustment system 100 may be alternatively configured to determine the mass balance of the rotary tool 11 with using e.g. a field balancer as the balance determining device.

(2) In the foregoing embodiment, there was disclosed an example in which the balance and runout adjustment system 100 effects a balance determining step and a balance adjusting step first and then effects a runout determining step and a runout adjusting step. However, the system 100 may be configured alternatively to effect a runout determining step and a runout adjusting step firstly and then effect a balance determining step and a balance adjusting step.

(3) In the foregoing embodiment, there was disclosed an example in which in the tool holder 10, the ball body 40 and the screw member 41 (insertion member) are inserted and assembled into the screw hole 18 (insertion hole). Alternatively, it may be arranged to press the bottom portion of the screw hole 18 with using a pressing member having a cylindrical shape or an angular post-like shape or any other shape, instead of the ball body 40. For decreasing the contact area between such pressing member and the screw member 41, the leading end axial portion of the screw member 41 may be formed with a smaller diameter than the main body portion of the screw member 41 or at least one of the opposed end faces where the screw member 41 and the pressing member come into contact with each other may be formed as a curved protruding portion. Further alternatively, into the screw hole 18 (insertion hole), only the screw member 41 (insertion member) may be inserted and assembled. In this case, the leading end side of the screw member 41 needs to have a shape that allows contact with the bottom portion of the screw hole 18 (the inner face of the second hole portion 18b).

(4) In embodying the invention, the tool holder 10 can be any such holder which is attached to the spindle 2 of the machine tool 1 and to which the tool 5 is to be attached.

INDUSTRIAL APPLICABILITY

The present invention can be widely used for adjustment of mass balance and runout amount of a rotary tool.

REFERENCE SIGNS LIST

1: machine tool
2: spindle
3: first mark
4: second mark
5: tool
5A: blade portion
10: tool holder
11: rotary tool
13: third mark
14: fourth mark
19: flange-like portion (intermediate portion)
19a: end face
18: screw hole (insertion hole)
20: imaging device (balance determining device, runout determining device)
21: imaging section
22: controller (calculating section)
23: beam projecting section
24: image sensor
28: control board (controlling section)
29: trigger circuit
31: phase detecting section
40: ball body
41: screw member (insertion member)
100: balance and runout adjustment system
S: reference line
V1, V2, V3: vector
Z: rotational axis

The invention claimed is:

1. A balance and runout determining device for a rotary tool constituted by attaching a tool to a tool holder mounted on a spindle, the determining device comprising:
    an image sensor for imaging the rotary tool; and
    a calculating section for calculating a mass balance and a runout amount of the rotary tool based on the image obtained by the image sensor;
    wherein in the course of rotation of the rotary tool as being mounted on the spindle, the calculating section obtains outer circumference position data of the rotary tool based on the obtained image, respectively for a case of adding a predetermined mass to a predetermined position of the tool holder and a case of not adding the predetermined mass to the predetermined position of the tool holder and determines a mass balance of the rotary tool from comparison between the outer circumference position data for the case of addition of the predetermined mass and the outer circumference position data for the case of no addition of the predetermined mass; and
    wherein in the course of rotation of the rotary tool as being mounted on the spindle, the calculating section obtains shape data of the rotary tool based on the obtained image and calculates a runout amount of the rotary tool based on the shape data.

* * * * *